United States Patent [19]

Mikuni

[11] Patent Number: 5,084,774
[45] Date of Patent: Jan. 28, 1992

[54] IMAGE PROCESSING APPARATUS HAVING TWO READ MODES

[75] Inventor: Makoto Mikuni, Kanagawa, Japan

[73] Assignee: Canon Kabushiki Kaisha, Tokyo, Japan

[21] Appl. No.: 637,948

[22] Filed: Jan. 8, 1991

Related U.S. Application Data

[63] Continuation of Ser. No. 492,335, Mar. 12, 1990, abandoned, which is a continuation of Ser. No. 193,583, May 13, 1988, abandoned.

[30] Foreign Application Priority Data

May 18, 1987 [JP] Japan .............................. 62-121609

[51] Int. Cl.$^5$ .............................................. H04N 1/04
[52] U.S. Cl. ......................................................... 358/474
[58] Field of Search ............... 358/474, 486, 488, 494, 358/496, 497, 498, 400, 401, 403, 404, 406, 407, 434, 435, 436, 437, 438

[56] References Cited

U.S. PATENT DOCUMENTS

| | | | |
|---|---|---|---|
| 3,914,538 | 10/1975 | Perreault et al. | 358/435 |
| 4,113,992 | 9/1978 | Gorham | 358/280 |
| 4,249,216 | 2/1981 | Kanda | 358/280 |
| 4,414,579 | 11/1983 | Dattilo | 358/256 |
| 4,524,393 | 5/1985 | Ohzeki | 358/280 |
| 4,583,124 | 4/1986 | Tsuji | 358/256 |
| 4,598,323 | 7/1986 | Honjo | 358/280 |
| 4,607,289 | 8/1986 | Kurokawa | 358/280 |
| 4,622,594 | 11/1986 | Honjo et al. | 358/494 |
| 4,646,160 | 2/1987 | Iizuka | 358/280 |
| 4,675,741 | 6/1987 | Shinohara | 358/494 |
| 4,737,856 | 4/1988 | Shimizu | 358/285 |
| 4,746,986 | 5/1988 | Tanigawa | 358/280 |
| 4,754,335 | 6/1988 | Izawa | 358/257 |
| 4,758,866 | 7/1988 | Ito | 355/55 |
| 4,998,173 | 3/1991 | Tamura et al. | 358/400 |

*Primary Examiner*—Jin F. Ng
*Assistant Examiner*—Jerome Grant, II
*Attorney, Agent, or Firm*—Fitzpatrick, Cella, Harper & Scinto

[57] ABSTRACT

An image processing apparatus includes a reading unit operative in a first mode for reading image data during feeding of an original and a second mode for reading the image data while the original is kept stopped at a predetermined position, a processing system for processing the image data read by the reading unit, a key input unit for inputting an instruction of additional reading in the second mode after image reading in the first mode is completed, and a CPU for controlling the reading unit so as to perform additional reading in the second mode in response to the instruction output from the key input unit and for controlling the processing system so as to perform processing in a predetermined processing condition which is the same as that of the image data read in the first mode.

19 Claims, 13 Drawing Sheets

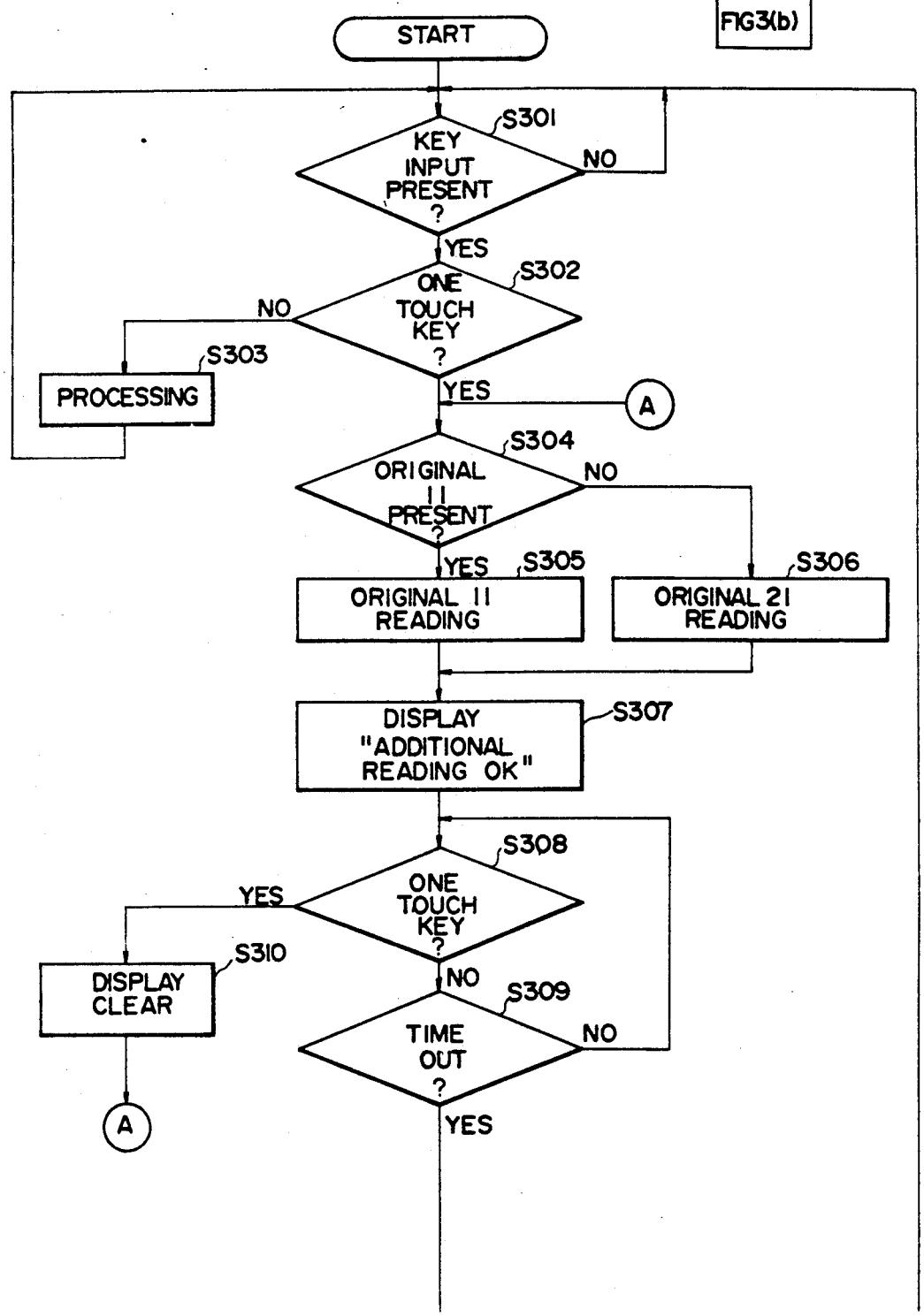

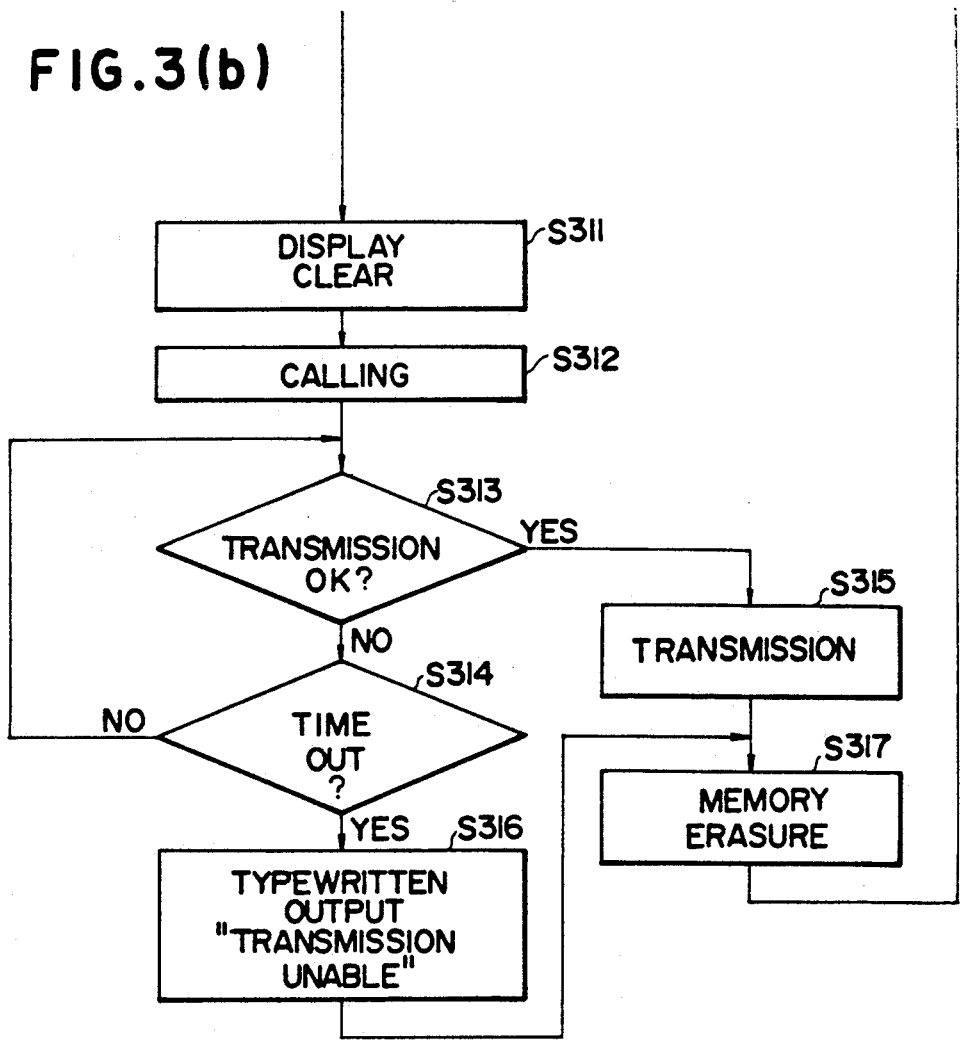

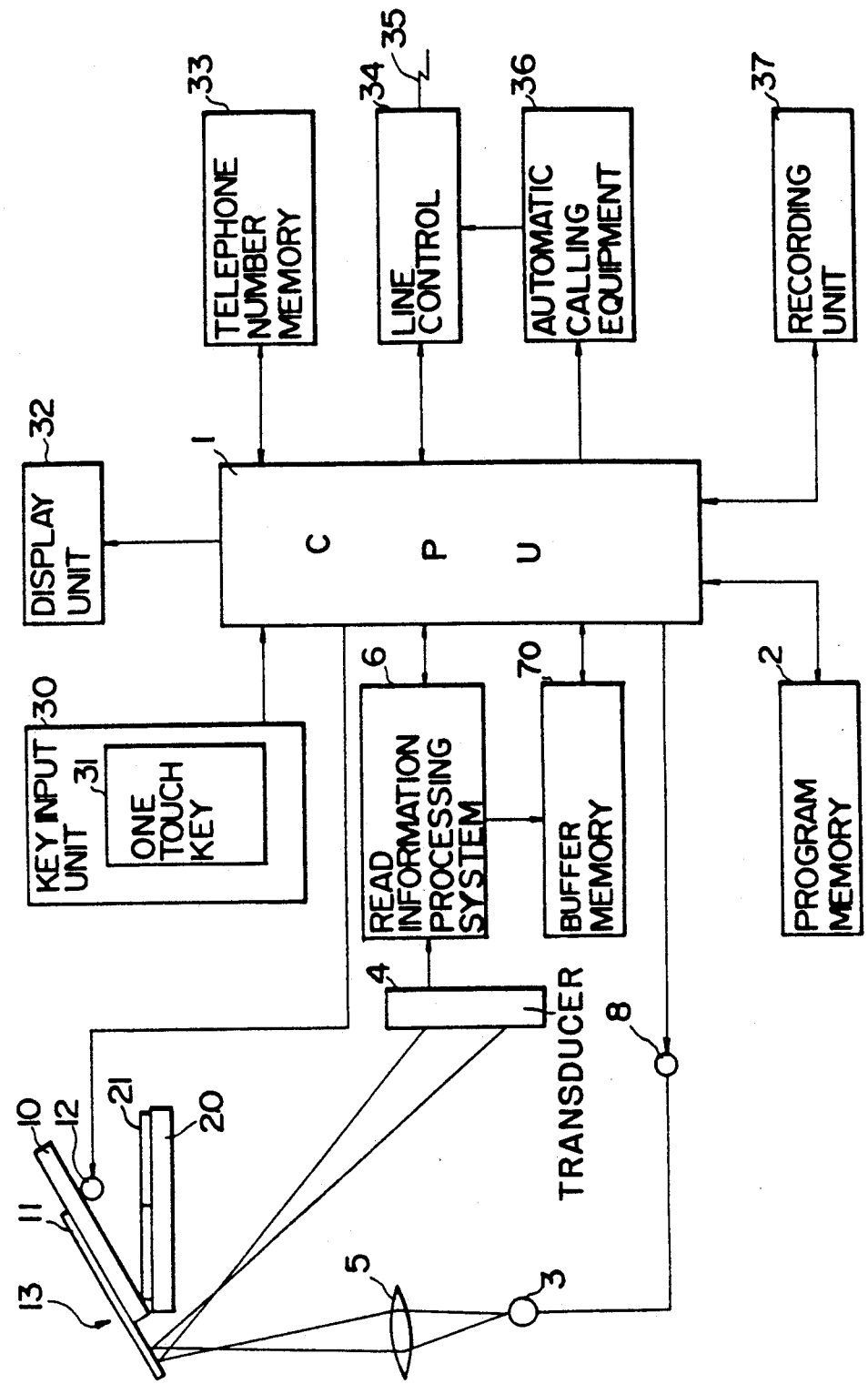

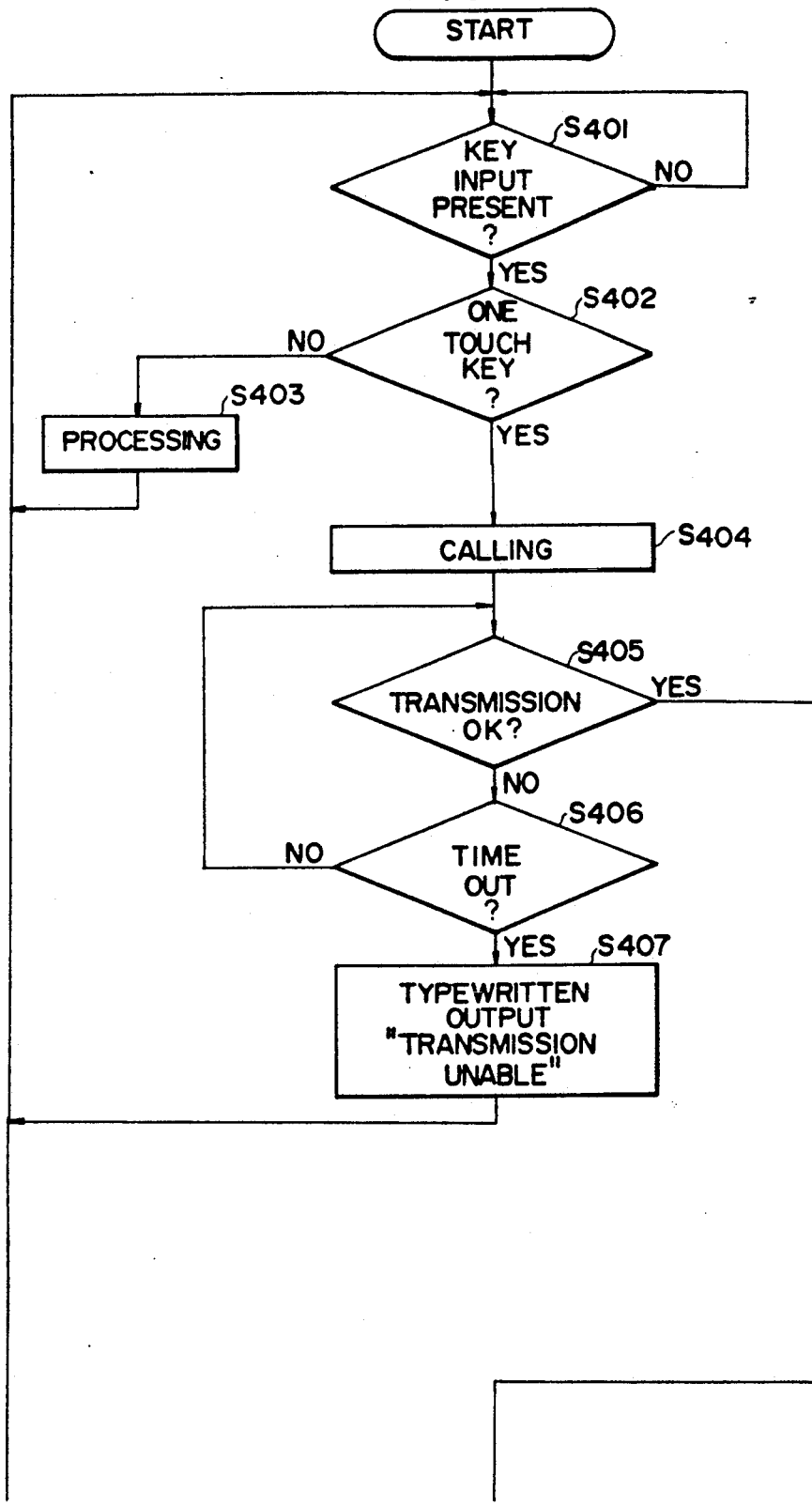

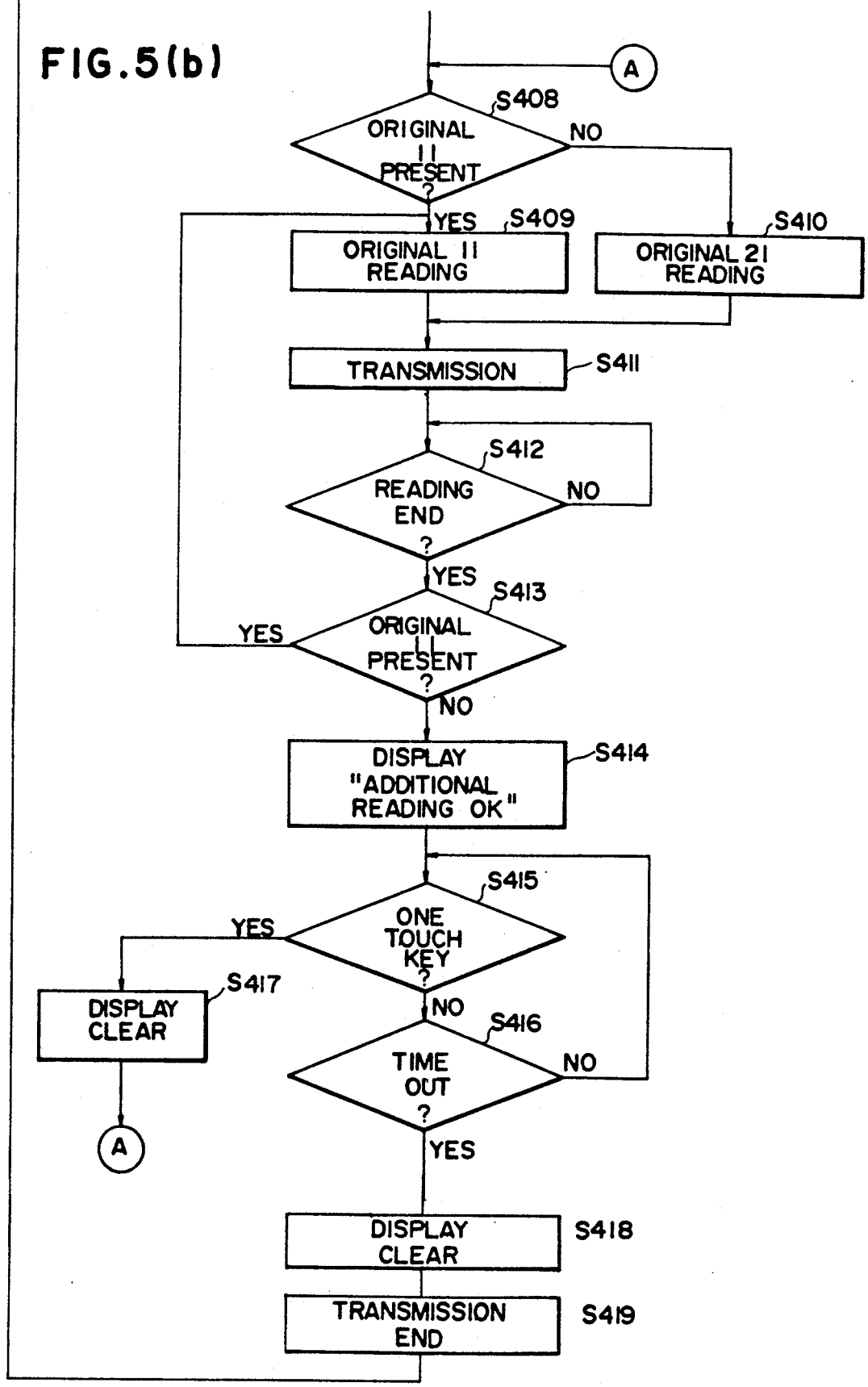

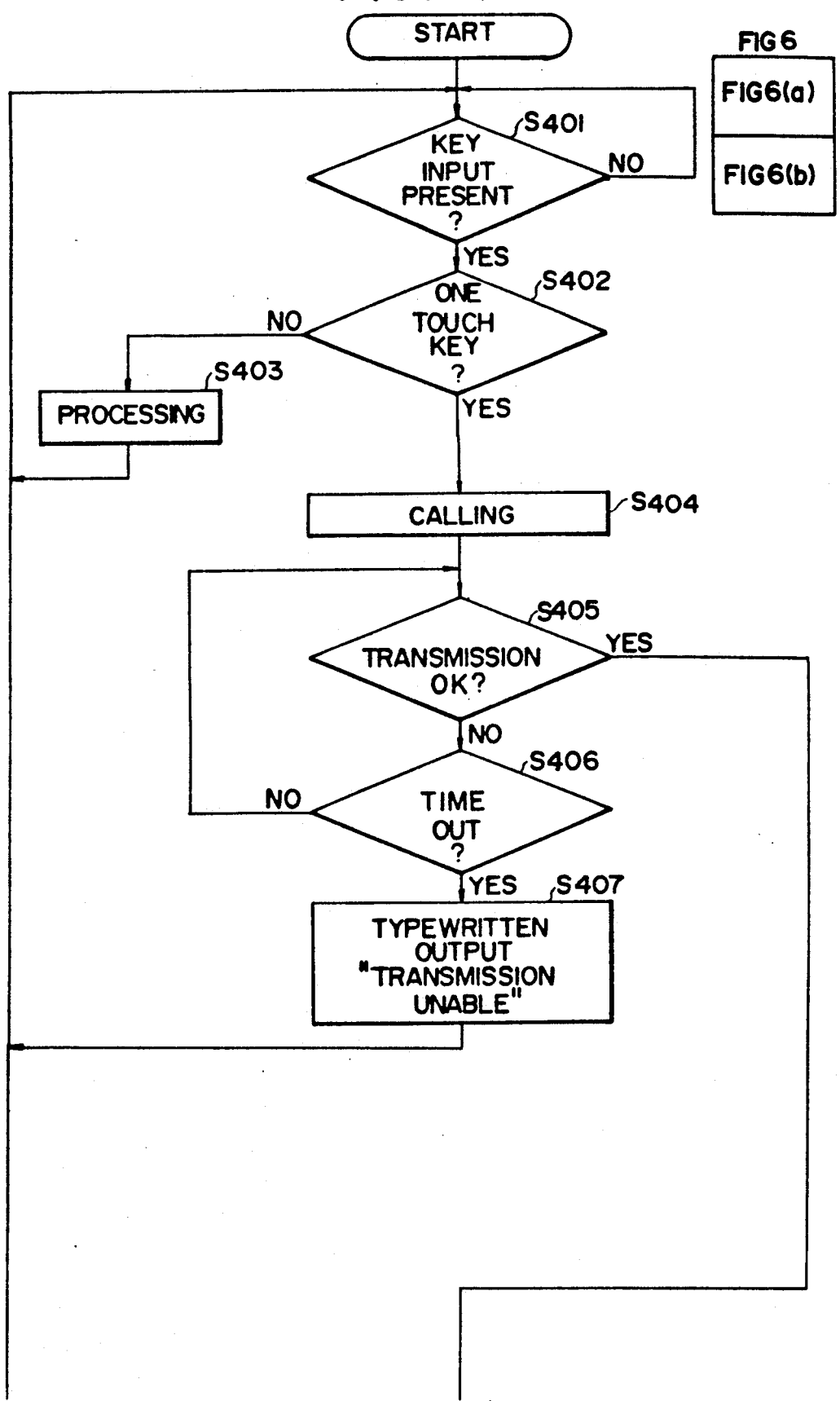

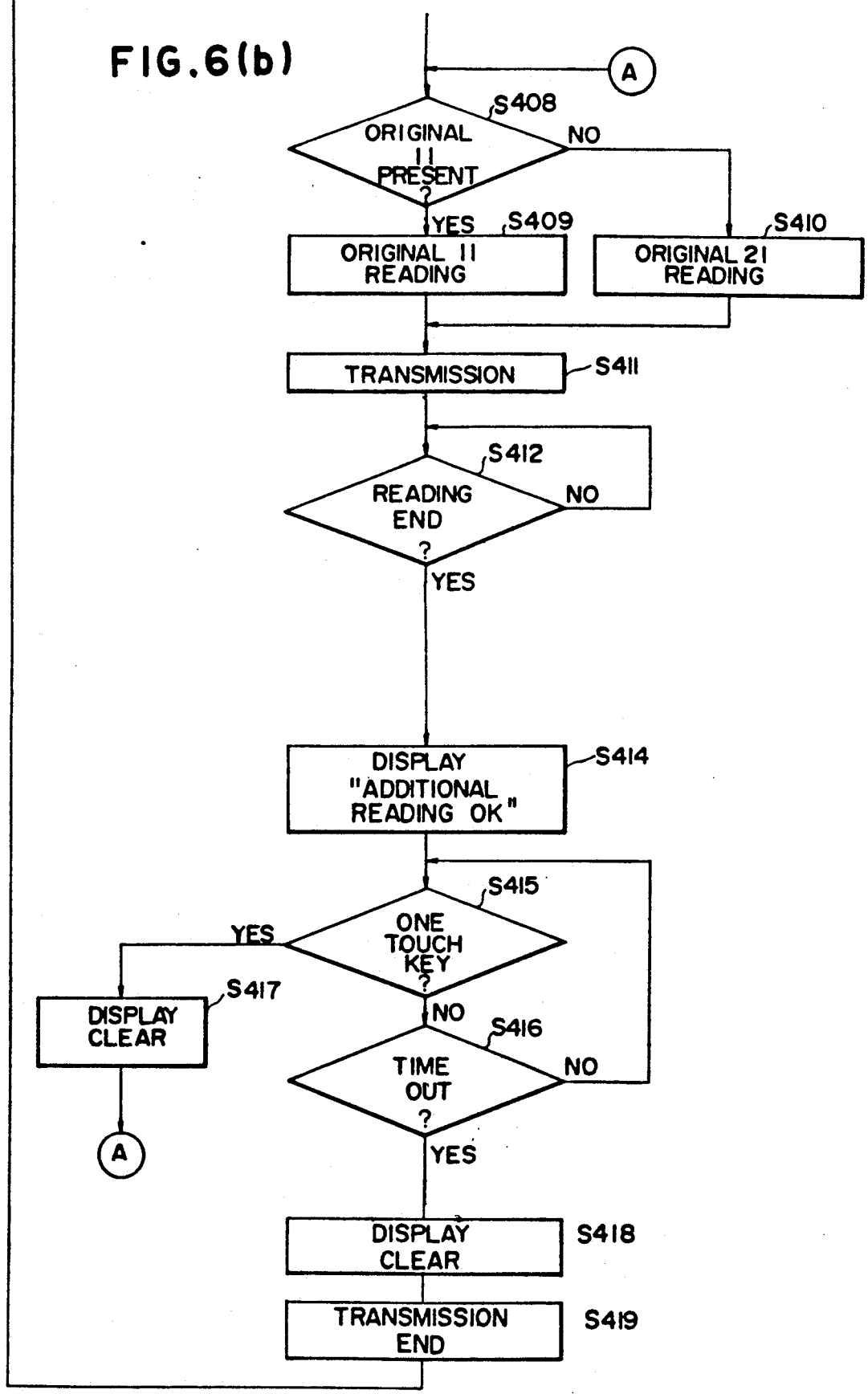

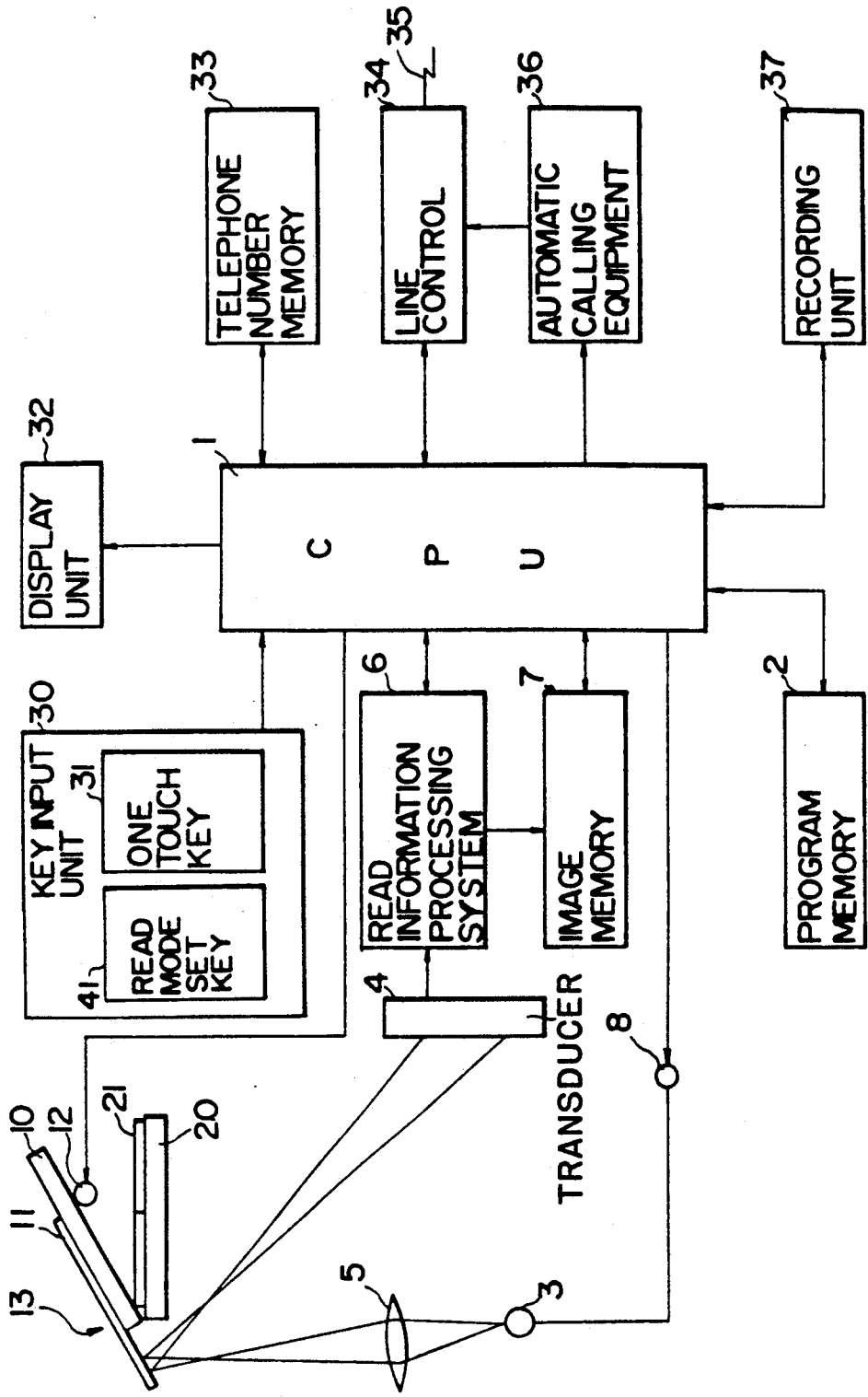

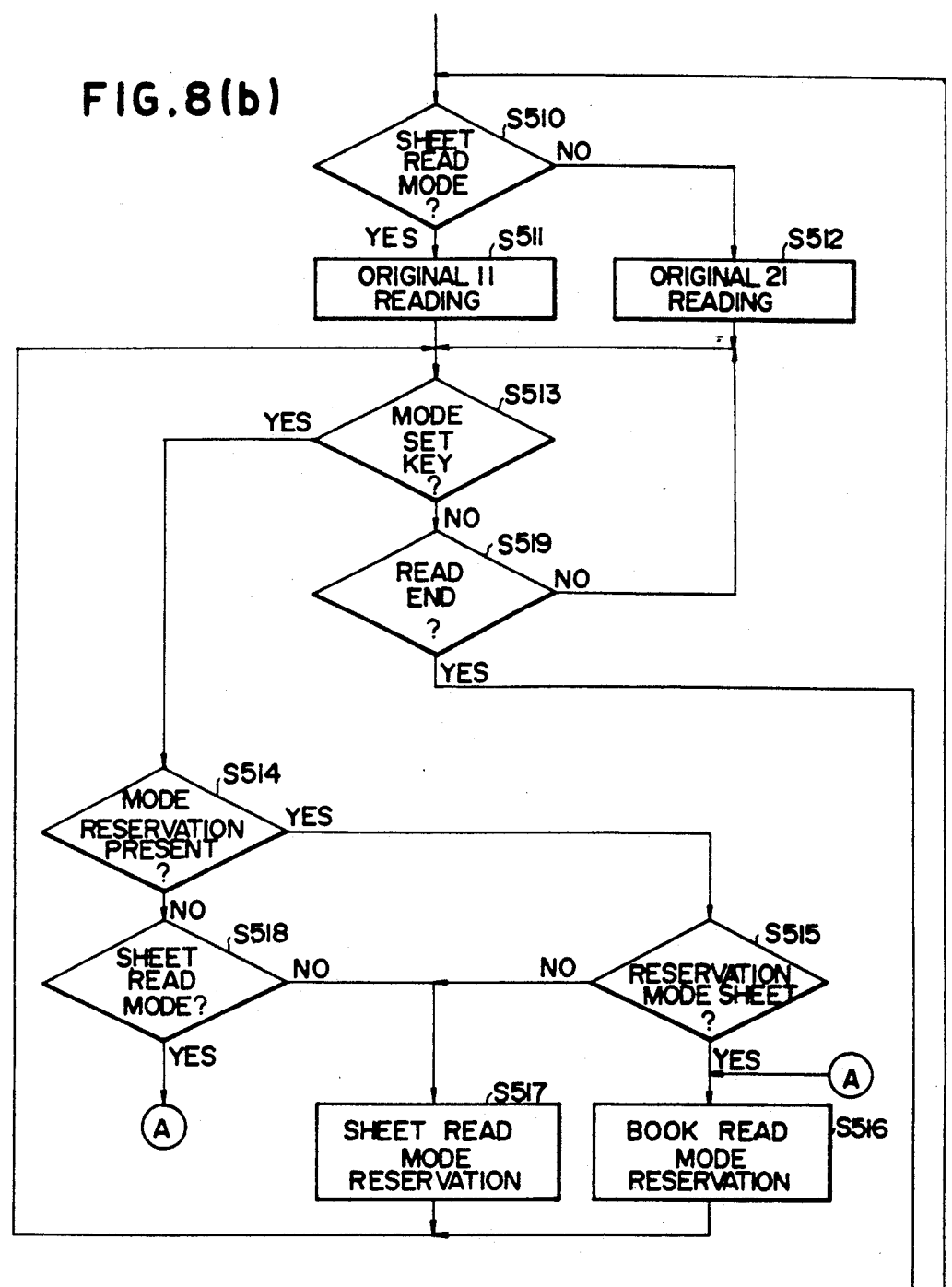

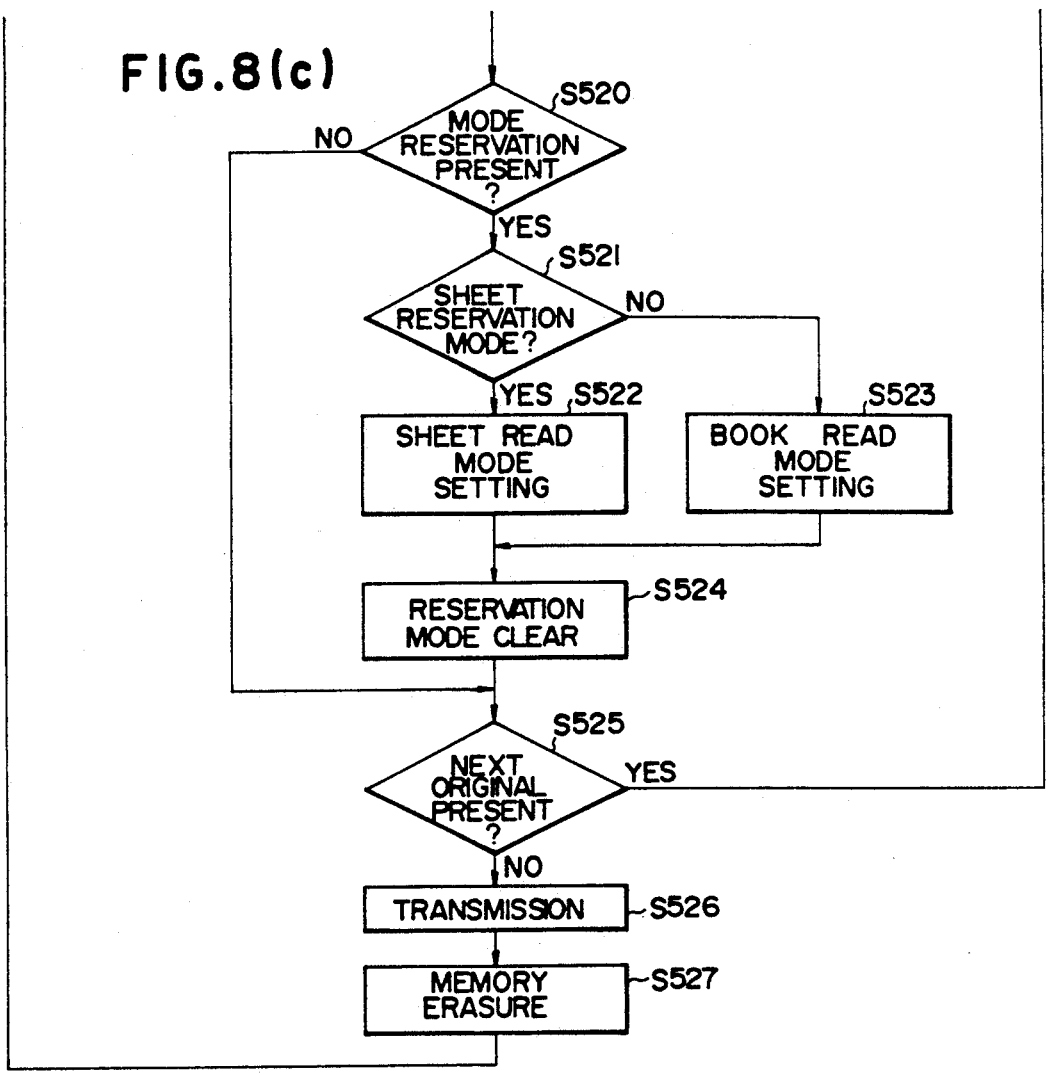

IMAGE PROCESSING APPARATUS HAVING TWO READ MODES

This application is a continuation of application Ser. No. 07/492,335 filed Mar. 12, 1990, now abandoned, which is a continuation of application Ser. No. 07/193,583, filed May 13, 1988, now abandoned.

BACKGROUND OF THE INVENTION

The present invention relates to an image processing apparatus having an image read function.

A facsimile machine is known as one of the apparatuses of this type. Some conventional facsimile machines have a plurality of read modes (U.S. Ser. No. 664,783 filed on Oct. 25, 1984 now U.S. Pat. No. 4,622,594 and U.S. Ser. No. 663,143 filed on Oct. 22, 1984 now U.S. Pat. No. 4,598,323).

In a conventional apparatus of this type, an image is read and transmitted in only a preselected read mode or a predetermined order of read modes. When an operator wishes to read and transmit originals in an order different from the predetermined order, the originals must be divided into a plurality of groups and these groups must be separately transmitted even to one destination, resulting in inconvenience.

In addition, the transmission sequence is started from the beginning even for additional reading and transmission, thus increasing the processing time.

SUMMARY OF THE INVENTION

The present invention has been made in consideration of the above conventional problems, and has as its object to improve an image processing apparatus having an image read function.

It is another object of the present invention to provide an image processing apparatus having improved operability.

It is still another object of the present invention to provide an image processing apparatus capable of shortening a time required for image reading and processing.

It is still another object of the present invention to provide an image processing apparatus capable of performing image reading in a desired order of read modes during one processing cycle.

It is still another object of the present invention to provide an image processing apparatus capable of additionally reading an image of an original in an image read mode while the original is stopped upon completion of a mode for moving an original and reading an image of the original.

The above and other objects, features, and advantages of the present invention will be apparent from the following description in conjunction with the accompanying drawings.

BRIEF DESCRIPTION OF THE DRAWINGS

FIG. 3 includes 3(a) and 3(b), which are a flow charts for explaining the operation of the first embodiment;

FIG. 4 is a block diagram showing an image processing apparatus according to a second embodiment of the present invention;

FIG. 5 includes FIGS. 5(a) and 5(b), which are a flow charts for explaining the operation of the second embodiment;

FIG. 6 includes FIGS. 6(a) and 6(b), which are a flow charts for explaining the operation of a third embodiment of the present invention;

FIG. 7 is a block diagram showing an image processing apparatus according to a fourth embodiment of the present invention.

DETAILED DESCRIPTION OF THE PREFERRED EMBODIMENTS

Figure 1:
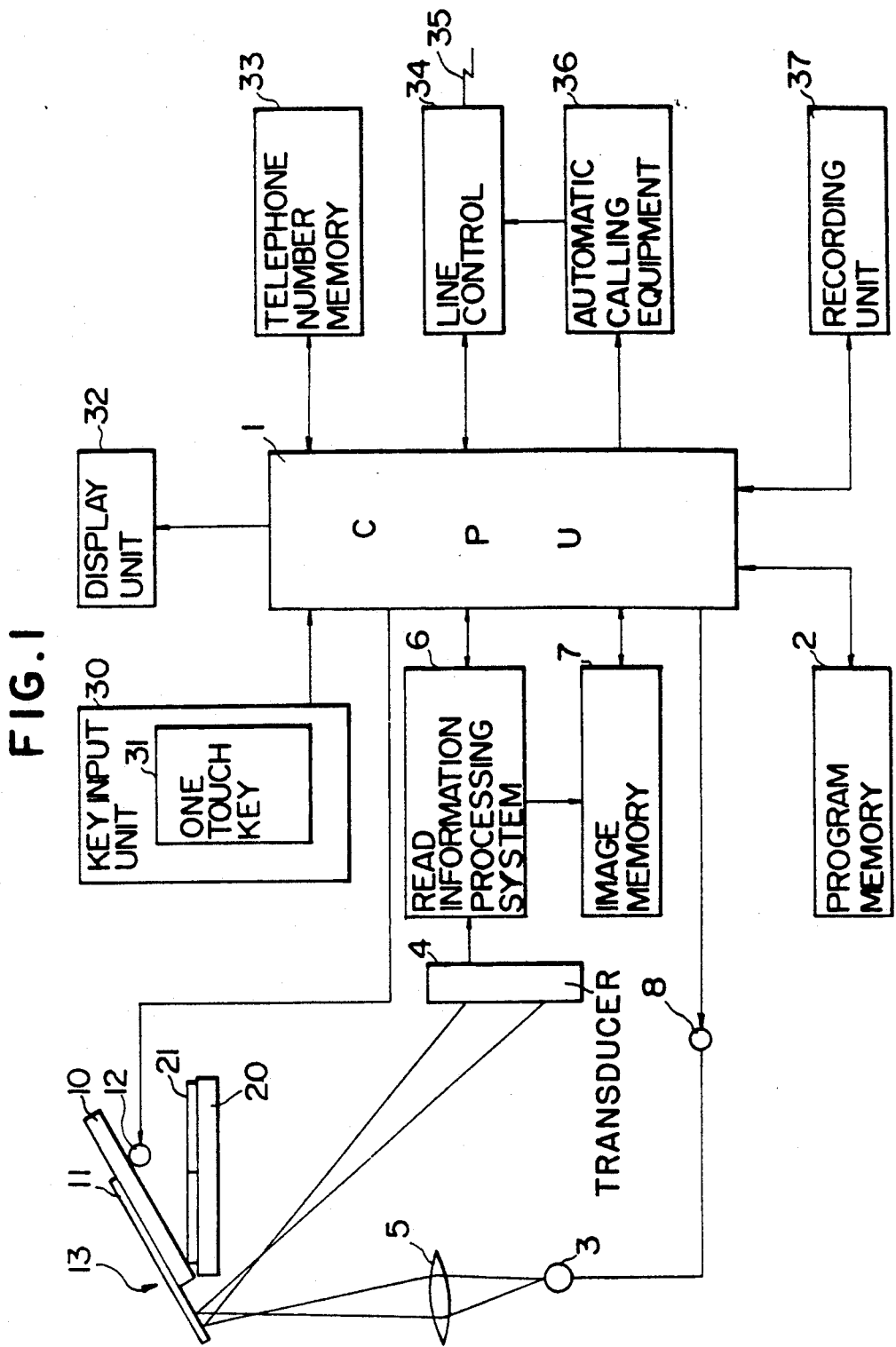
FIG. 1 is a block diagram showing an image processing apparatus according to a first embodiment of the present invention.

FIG. 1 is a block diagram showing an image processing apparatus according to a first embodiment of the present invention. The image processing apparatus includes a CPU 1 for controlling the operation of the overall apparatus. The CPU 1 is connected to a program memory 2. The CPU 1 controls a fluorescent lamp 3 serving as a light source through a motor 8. The motor 8 also drives a lens 5. A photoelectric transducer element 4 such as a CCD is connected to the CPU 1 through a read information processing system 6. The photoelectric transducer element 4 converts photoelectrically converted image information into a binary level signal (i.e., white level and black level). An image memory 7 is connected to the read information processing system 6 and the CPU 1. The image memory 7 stores image information processed by the read information processing system 6 under the control of the CPU 1.

In this image processing apparatus, the fluorescent lamp 3 and the lens 5 are driven by the motor 8 to change a distance between the fluorescent lamp 3 and the lens 5 so that a magnification of an image on the photoelectric transducer element 4 can be kept unchanged even if a read position is changed. A plurality of originals 11 can be placed on an original table 10 and are conveyed by a motor 12 one by one. The fluorescent lamp 3, the photoelectric transducer element 4, the lens 5, the read information processing system 6, the original table 10, the original 11, and the motor 12 constitute a first image reading means. This reading means is used in a sheet mode for reading image data while a sheet original is moved. In this case, the fluorescent lamp 3 and the lens 5 are fixed at first read positions.

A sensor 13 detects the presence/absence of an original on the original table 10. When the sensor 13 detects the presence of the original, the sheet mode is set. Original feeding and reading in the sheet mode continues until the sensor 13 detects the absence of the original.

Figure 2:
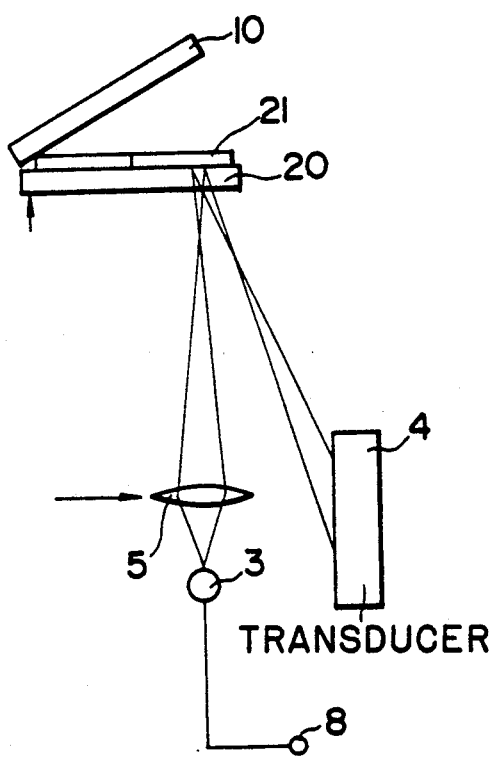
FIG. 2 is a view for explaining a reading state of an original 21.

The image processing apparatus also includes an original table 20 of transparent glass which supports an original 21. The fluorescent lamp 3, the photoelectric transducer element 4, the lens 5, the read information processing system 6, the motor 8, the original table 20, and the original 21 constitute a second image reading means. The second image reading means is used in a book mode for reading an image of a book-like original which is stopped at a predetermined position. When the book mode is selected, the lens 5 and the fluorescent lamp 3 are moved to a read start position as indicated by an arrow in FIG. 2. The motor 8 drives the fluorescent lamp 3 and the lens 5 to read an image of the original 21. A reading state of the original 21 is shown in FIG. 2.

In the image processing apparatus, a key input unit 30, a display unit 32, a telephone number memory 33, a line control 34, a line 35, automatic calling equipment 36, and a recording unit 37 are connected to and controlled by the CPU 1. The key input unit 30 includes one-touch keys 31 each corresponding to a destination telephone number. The display unit 32 comprises LED or LCD elements. The telephone number memory 33 stores telephone numbers respectively corresponding to the one-touch keys 31,.

FIG. 3(a) and 3(b) comprise is a flow chart for explaining the operation of the first embodiment having the above arrangement.

In this embodiment, the sheet or book mode is set in accordance with an original presence/absence detection output from the sensor 13. When the same one-touch key as the previous key is depressed within a predetermined period of time upon completion of image reading in the sheet or book mode, additional image reading can be performed in the sheet mode if the sensor 13 detects the original. However, if the sensor 13 does not detect the original, additional image reading is performed in the book mode.

The operation of the image processing apparatus according to the first embodiment will be described in detail. In the standby mode, the CPU 1 waits for an input from the key input unit 30 (step S301). When a key input excluding the one-touch keys is present, predetermined processing is performed, and the CPU 1 is then reset in the standby mode (steps S302→S303→S301). If one of the one-touch keys 31 is depressed, the CPU 1 determines on the basis of information from the sensor 13 whether the original 11 is present on the original table 10 (step S304). If YES in step S304, the sheet mode is set. However, if NO in step S304, the book mode is set. The image of the original 21 on the original table 20 is read, and the read image information is stored in the image memory 7. When reading is completed, the CPU 1 causes the display unit 32 to display "ADDITIONAL READING OK" (step S307). When the same one-touch key 31 as that in step S302 is depressed within a predetermined period, the display content in step S307 is cleared in step S310. The flow returns to step S304. The image of the original 11 or 21 is read in accordance with the presence/absence of the original 11. The read image information is additionally stored in the image memory 7. After the operation in step S307 is completed, if the same one-touch key 31 as that in step S302 is not depressed, the display content in step S307 is cleared in step S311. A destination is called by the automatic calling equipment 36 using a telephone number which is registered in the telephone number memory 33 in one-to-one correspondence with the one-touch key 31 (step S312). If a "transmission enable" state is set within a predetermined period of time, the image information stored in the image memory 7 is transmitted to the line control 34 through a line 35 (step S315). When the transmission operation is completed, the content of the image memory 7 is erased (step S317), and the CPU 1 is then reset in the standby mode. When the "transmission enable" state cannot be set within the predetermined period of time after calling in step S312 is completed, the CPU 1 causes the recording unit 37 to output a typewritten output "TRANSMISSION UNABLE" (step S316). The content of the image memory 7 is erased (step S317), and the CPU 1 is reset in the standby state.

FIG. 5(a) and 5(b) comprise is a flow chart for explaining the operation of a second embodiment of the present invention. Although all read data including additional data for one destination are stored in the image memory 7 and then transmitted in the first embodiment, a buffer memory 70 is arranged in place of a large-capacity memory in the second embodiment. In the second embodiment, original image reading and transmission are simultaneously performed. The block diagram of the second embodiment is illustrated in FIG. 4. A detailed description will be made with reference to FIGS. 4 and 5(a) and 5(b). The operations in steps S401 to 403 are the same as those in FIG. 3(a) and 3(b). When one of one-touch keys 31 is depressed, a destination is called by automatic calling equipment 36 using a telephone number which is registered in a telephone number memory 33 in one-to-one correspondence with the depressed key 31 (step S404). When a "transmission enable" state is set within a predetermined period of time, the flow advances to step S409. However, if a "transmission enable" state is not set within the predetermined period of time, the CPU 1 causes a recording unit 37 to output a typewritten output "TRANSMISSION UNABLE" (step S407). Thereafter, the CPU 1 is reset in the standby state.

The CPU 1 determines in step S408 whether an original is present on an original table 10 on the basis of an output from a sensor 13. If YES in step S408, an image of the original on the original table 10 is read. However, if NO in step S408, an image of an original 21 on an original table 20 is read. The read data is stored in the buffer memory while being transmitted (steps S409 to S411). When reading of a one-page original is completed (S412), the CPU 1 determines in step S413 whether an original is present on the original table 10. If YES in step S413, the operations in steps S409, S411, and S412 are repeated. However, if NO in step S413, the CPU 1 causes a display unit 32 to display "ADDITIONAL READING OK" (step S414). If the same one-touch key as in step S402 is depressed in step S415 within a predetermined period of time, the display content in step S414 is cleared in step S417. The flow returns to step S408. The original 11 or 21 is read in accordance with the presence/absence of the original 11. Transmission of data for one destination is performed.

However, if NO in step S415, the display content in step S414 is cleared in step S418. Transmission is interrupted in step S419, and the CPU 1 is reset in the standby state.

FIG. 6(a) and 6(b) is a flow chart for explaining the operation of a third embodiment of the present invention. Although a plurality of originals can be set on the original table 10 and can be fed one by one in the second embodiment, only one original can be set on the original table 10 in the third embodiment. In the third embodiment, the operation corresponding to that in step S413 in FIG. 4 is omitted, and other operations are the same as those in FIG. 4.

In the third embodiment, when reading of a one-page original is completed, the CPU 1 causes the display unit 32 to display "ADDITIONAL READING OK". When the same one-touch key is depressed within a predetermined period of time, additional reading is performed.

A fourth embodiment of the present invention will be described below. Although image reading is performed in one of the sheet and book modes and then additional reading is performed in the other mode in accordance with the presence/absence of the original on the original table 10, reading of the next original can be reserved during reading of one original in the fourth embodiment. The fourth embodiment will be described in detail with reference to FIGS. 7 and 8a-8c. FIG. 7 is a block diagram showing an arrangement of the fourth embodiment, and the same reference numerals as in FIG. 1 denote the same parts in FIG. 7. An image processing apparatus of this embodiment includes a read mode set key 41 for selecting the sheet or book mode for the next original.

Figure 8A:
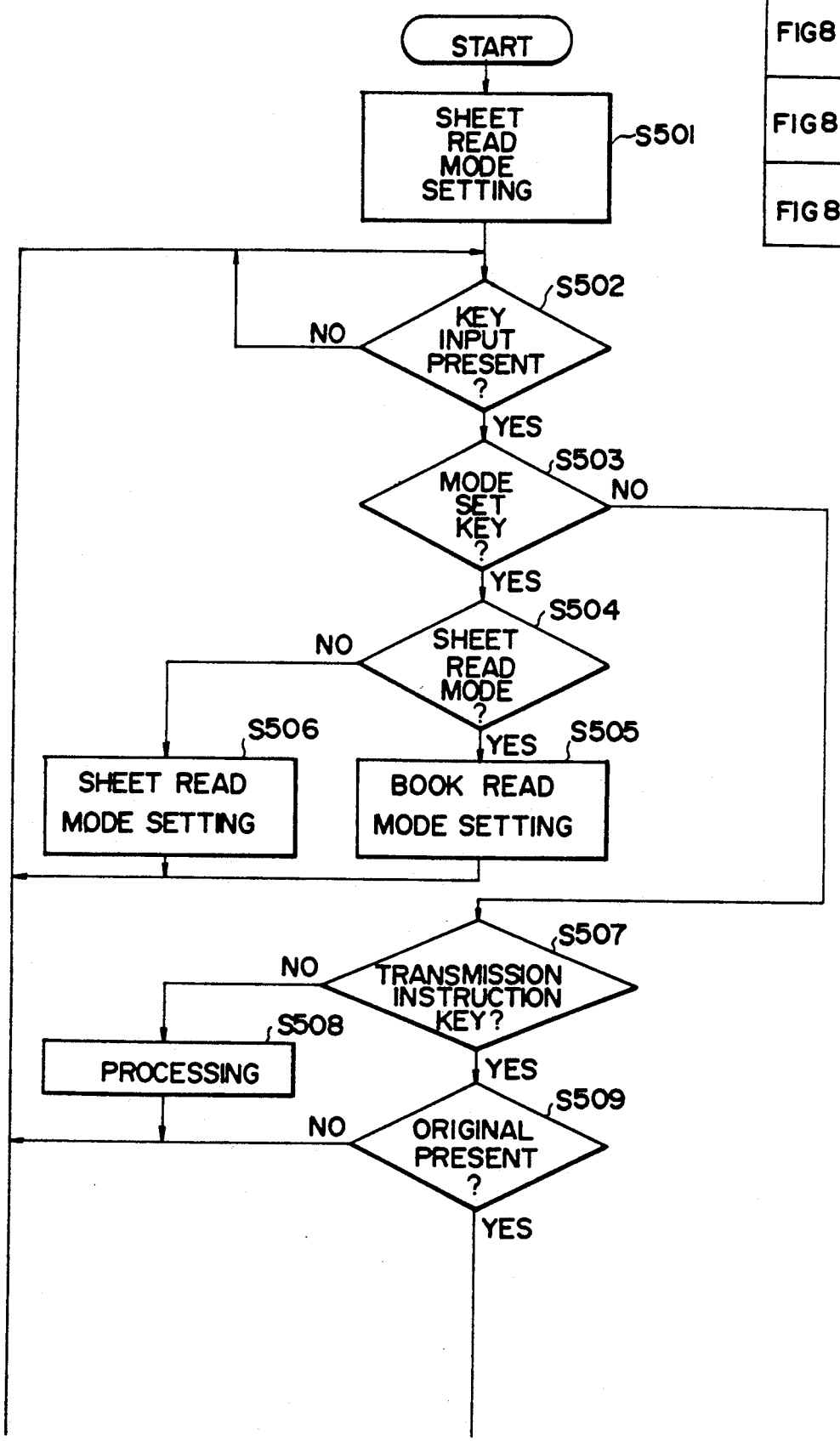
FIG. 8 includes FIGS. 8(a), 8(b) and 8(c), which are a flow chart for explaining the operation of the fourth embodiment.

FIG. 8(a), 8(b) and 8(c) comprise s a flow chart for explaining the operation of the fourth embodiment. The operation of the fourth embodiment will be described with reference to the flow chart.

When a power switch is turned on, the sheet mode is set and displayed on a display unit 32 (step S501). A CPU 1 waits for a key input (step S502). When the read mode set key 30 is depressed in step S503, a read mode different from the current read mode is set. If the current mode is the sheet mode, as shown in steps S504 to 506, the mode is changed to the book mode. However, if the current mode is the book mode, the mode is changed into the sheet mode. The changed mode is displayed on the display unit 32. If the operated key is not the mode set key or a transmission key, necessary processing is performed in step S508. The flow then returns to step S502. If the transmission key (e.g., a one-touch key 31) is depressed in step S502, the CPU 1 checks whether an original is set in an original reading means corresponding to the set read mode in accordance with information from a sensor 13. If no original is detected, the key input is neglected and the flow returns to step S502. However, if an original is detected, reading of an original 11 or 21 is performed in the currently set read mode. The read image information is stored in an image memory 7 (steps S509 to 512). During reading, the CPU 1 monitors the read mode set key 41. If the read mode set key 41 is depressed, a read mode different from the currently set read mode is reserved for the next original. If the read mode set key is depressed while the read mode of the next original has been reserved, a read mode different from the currently reserved mode is set as a read reservation mode for the next original (steps S513 to S518). It should be noted that a reservation mode is signaled to the operator by flickering the corresponding portion of the display unit 32 when the reserved read mode is different from the current read mode. If a read mode is reserved upon completion of reading of the original, the read mode is changed to the reserved mode (steps S520 to S523), and the reserved mode is cleared. It should be noted that the read mode of the next original is given as the current read mode if the read mode is not reserved. If an original is present in the original reading means corresponding to the read mode of the next original, the flow returns to step S510. The above operations are repeated. When originals are not present in the reading means designated for the read mode of the next original, a destination having a telephone number stored in a telephone number memory 33 in one-to-one correspondence with the depressed transmission instruction key is called by automatic calling equipment 36 in step S507. Image information stored in the image memory 7 is transmitted onto a line 35 through a circuit control 34. If transmission is completed, the content of the memory 7 is erased and the CPU 1 is reset in the standby state (steps S525→S526→S527→S502).

The one-touch key 31 in each embodiment described above may be replaced with abbreviated dial keys (e.g., ▯ ▯ ▯) to obtain the same effect as in the above embodiment.

With the above arrangement, transmission for one destination can be appropriately performed by a plurality of image reading means during one transmission cycle. At the same time, an image of an original stored in one image reading means may be transmitted during transmission from another image reading means.

In the above embodiments, image data are read and transmitted. However, the present invention is not limited to the above arrangement. An image may be recorded on a sheet or filed in an optical disk or the like.

I claim:

1. An image processing apparatus comprising:
   reading means operative to read an original document in first and second modes, and for converting an image of the original document into image data that is an electric signal;
   selecting means for selecting one of said first and second modes;
   memory means for storing image data read by said reading means;
   processing means for processing the image data stored in said memory means;
   key input means for entering an instruction for additional reading; and
   control means responsive to entry of said instruction of said key input means within a predetermined period of time after reading in one of the first or second modes is completed, for permitting said reading means to perform the additional reading in the mode selected by said selecting means, and for causing the image data read in the additional reading to be stored in said memory means which also stores the image data read prior to the additional reading, and for controlling said memory means so as to output the image data stored therein to said processing means after completion of the additional reading.

2. An apparatus according to claim 1, wherein said processing means comprises transmitting means for transmitting the image data stored in said memory means.

3. An apparatus according to claim 2, wherein said key input means is operable to input a transmission instruction, and wherein said control means continues image reading and causes the read image data to be stored in said memory means when the transmission instruction is output from said key input means to the same destination within a predetermined period of time after completion of image reading in the first mode.

4. An apparatus according to claim 1, wherein the first mode comprises a mode for reading the image while an original comprises moved, and the second mode is a mode for reading the image while the original is stopped.

5. An apparatus according to claim 4, wherein said reading means comprises an original table for supporting a plurality of originals thereon and feeding means for feeding the originals from said original table one by one.

6. An apparatus according to claim 4, wherein said reading means have different read positions in the first and second modes.

7. An image processing apparatus comprising:

reading means for reading an original document set at a reading position, and for converting an image of the original document into image data which is an electric signal;

memory means for storing the image data ready by said reading means;

transmission means for transmitting the image data stored in said memory means key input means for entering an instruction for control means for controlling the read operation of said reading means and the transmitting operation of said transmission means, wherein when a first original document is read and transmitted by said transmission means, if the instruction is entered from said key input means within a predetermined time from termination of the reading of the first original document, said control means causes said reading means, in response to the instruction, to perform the reading operation for a second original document, and causes said transmission means to transmit image data of the first original document and image data of the second original document as a series of image data.

8. An apparatus according to claim 7, wherein said processing means includes transmission means for transmitting the image data stored in said memory means.

9. An apparatus according to claim 8, wherein said transmission means transmits the image data using a telephone circuit, and wherein said key input means includes keys for entering a telephone number of a transmission destination.

10. An apparatus according to claim 9, wherein said key input means includes a plurality of one-touch keys each corresponding to a telephone number specifying an associated destination.

11. An image processing apparatus comprising:

reading means operative in a first mode for reading an original document during dynamic feeding of the original document, and operative in a second mode for reading the original document while the original document is held at a predetermined position, wherein said reading means converts an image of the original document into image data that is an electric signal;

processing means for processing the image data read by said reading means;

instructing means for generating an instruction of additional reading in the second mode after image reading in the first mode is completed; and control means for controlling said processing means so as to perform processing of the image data on a predetermined condition after a predetermined period of time has lapsed from completion of image data reading in the first mode, wherein if an additional reading instruction is generated by said instructing means within the predetermined period of time, said control means controls said reading means so as to perform the additional reading on a second original in the second mode, and after completion of said additional reading, said control means controls said processing means so as to perform processing of the image data on said predetermined condition.

12. An apparatus according to claim 11, wherein said control means controls said reading means so as to perform the additional reading in the second mode upon completion of reading in the first mode when the additional reading instruction is generated during reading in the first mode.

13. An apparatus according to claim 11, wherein said processing means comprises means for transmitting the image data.

14. An apparatus according to claim 13, wherein the processing condition includes a destination for said transmitting means.

15. An apparatus according to claim 14, wherein said transmitting means transmits the image data by using a telephone line, and wherein said instructing means includes key input means for inputting a destination telephone number.

16. An apparatus according to claim 15, wherein said key input means includes one-touch keys each corresponding to one destination telephone number.

17. An apparatus according to claim 15, wherein said key input means includes abbreviated dial keys.

18. An image processing apparatus comprising:

reading means operative in a first mode in which an original document is read during dynamic feeding of the original document and in a second mode in which the original document is read while the original document is held at a predetermined position, and for converting an image of the original document into image data that is an electric signal;

processing means for processing the image data read by said reading means;

key input means for selectively entering a selection signal selecting one of said first and second modes; and mode setting means for setting, during a reading of a first original in one of said first or second modes, a reading mode for a second original based on the selection signal entered from said key input means.

19. An image processing apparatus comprising:

reading means operative to read an image in first and second modes;

selecting means for selecting one of said first and second modes, said selecting means (1) determining the presence/absence of an original to be read in the first mode at a start of image reading, (2) selecting the first mode when the original is present, and (3) selecting the second mode when the original is absent;

memory means for storing image data read by said reading means;

processing means for processing the image data stored in said memory means;

key input means for entering an instruction for additional reading; and control means responsive to entry of said instruction of said key input means within a predetermined period of time after reading in one of the first or second modes is completed, for permitting said reading means to perform the additional reading in the mode selected by said selecting means, and for causing the image data read in the additional reading to be stored in said memory means which also stores the image data read prior to the additional reading, and for controlling said memory means so as to output the image data stored therein to said processing means after completion of the additional reading.

* * * * *

UNITED STATES PATENT AND TRADEMARK OFFICE
CERTIFICATE OF CORRECTION

PATENT NO. : 5,084,774
DATED : January 28, 1992
INVENTOR(S) : MAKOTO MIKUNI

Page 1 of 2

It is certified that error appears in the above-identified patent and that said Letters Patent is hereby corrected as shown below:

COLUMN 1

Line 64, "3(a) and 3(b)" should read --FIGS. 3(a) and 3(b)-- and "a" should be deleted.

COLUMN 2

Line 1, "a" should be deleted.
    Line 4, "a" should be deleted.

COLUMN 3

Line 9, "FIG. 3(a) and 3(b) comprise is a" should read --FIGS. 3(a) and 3(b) comprise--.
    Line 66, "FIG. 5(a) and 5(b) comprise is a" should read --FIGS. 5(a) and 5(b) comprise--.

COLUMN 4

Line 10, "403" should read --S403--.
    Line 47, "FIG. 6(a) and 6(b) is a flow chart" should read --FIGS. 6(a) and 6(b) are flow charts--.

COLUMN 5

Line 9, "s" should be deleted.
    Line 19, "506," should read --S506,--.

COLUMN 6

Line 57, "comprises" should read --is--.
    Line 58, "is" should read --comprises--.

UNITED STATES PATENT AND TRADEMARK OFFICE
CERTIFICATE OF CORRECTION

PATENT NO. : 5,084,774

DATED : January 28, 1992

INVENTOR(S) : MAKOTO MIKUNI

It is certified that error appears in the above-identified patent and that said Letters Patent is hereby corrected as shown below:

COLUMN 7

Line 5, "ready" should read --read--.
Lines 9 & 10 "for control" should read --for additional reading; and
          control--.
    Line 10, "trol" should be deleted.

Signed and Sealed this

Thirty-first Day of August, 1993

Attest:

BRUCE LEHMAN

Attesting Officer      Commissioner of Patents and Trademarks